(12) United States Patent
Robyak et al.

(10) Patent No.: US 10,755,226 B1
(45) Date of Patent: Aug. 25, 2020

(54) INFORMATION MANAGEMENT SYSTEM USING BLOCKCHAIN FUNCTIONALITIES

(71) Applicant: EMC IP Holding Company LLC, Hopkinton, MA (US)

(72) Inventors: Adam Robyak, Tampa, FL (US); Bertrand Sirodot, Calgary (CA); Brandon Kaier, Centennial, CO (US)

(73) Assignee: EMC IP Holding Company LLC, Hopkinton, MA (US)

( * ) Notice: Subject to any disclaimer, the term of this patent is extended or adjusted under 35 U.S.C. 154(b) by 225 days.

(21) Appl. No.: 15/441,588

(22) Filed: Feb. 24, 2017

(51) Int. Cl.
*G06Q 10/08* (2012.01)
*G06K 7/14* (2006.01)
*G06K 7/10* (2006.01)

(52) U.S. Cl.
CPC ....... *G06Q 10/087* (2013.01); *G06K 7/10366* (2013.01); *G06K 7/1413* (2013.01)

(58) Field of Classification Search
CPC . G06Q 10/087; G06K 7/10366; G06K 7/1413
See application file for complete search history.

(56) References Cited

U.S. PATENT DOCUMENTS

| | | | |
|---|---|---|---|
| 9,870,508 B1 * | 1/2018 | Hodgson | G06K 9/00744 |
| 2016/0261404 A1 * | 9/2016 | Ford | H04L 9/008 |
| 2017/0005804 A1 * | 1/2017 | Zinder | H04L 9/3247 |
| 2017/0011460 A1 * | 1/2017 | Molinari | G06Q 40/04 |
| 2017/0230189 A1 * | 8/2017 | Toll | G06Q 40/04 |
| 2017/0243212 A1 * | 8/2017 | Castinado | G06Q 20/401 |
| 2017/0330174 A1 * | 11/2017 | Demarinis | G06Q 40/04 |
| 2017/0344988 A1 * | 11/2017 | Cusden | H04L 9/3247 |
| 2018/0108024 A1 * | 4/2018 | Greco | G06F 21/44 |
| 2018/0139043 A1 * | 5/2018 | Jayachandran | G06Q 20/065 |
| 2018/0158162 A1 * | 6/2018 | Ramasamy | H04L 9/30 |
| 2018/0189528 A1 * | 7/2018 | Hanis | G06Q 10/087 |
| 2018/0232731 A1 * | 8/2018 | Liu | G06Q 20/3823 |
| 2018/0285971 A1 * | 10/2018 | Rosenoer | G06Q 40/025 |
| 2018/0341861 A1 * | 11/2018 | Katz | G06K 9/00221 |

OTHER PUBLICATIONS

Blockchain: the solution for transparency in product supply chains. Unknown Author. <https://www.provenance.org/whitepaper>. Retrieved Dec. 1, 2018. Originally published Nov. 21, 2015.*

"Blockchain for securing sustainable transport contracts and supply chain transparency." Amina Badzar. Retrieved from <http://lup.lub.lu.se/luur/download?func=downloadFile&recordOld=8880383&fileOld=8880390> on Dec. 1, 2018. Published May 24, 2016.*

(Continued)

*Primary Examiner* — Nathan A Mitchell
(74) *Attorney, Agent, or Firm* — Ryan, Mason & Lewis, LLP (57) ABSTRACT

An information management system includes a blockchain infrastructure configured to maintain a blockchain for one or more smart contracts generated for one or more assets managed by the information management system, and one or more application programming interfaces configured to provide access to the one or more smart contracts of the blockchain enabling input of data to a given smart contract for a given asset and retrieval of data from the given smart contract of the given asset.

20 Claims, 6 Drawing Sheets

(56) References Cited

OTHER PUBLICATIONS

"Why Blockchain Is a Game Changer for Supply Chain Management". Unknown Author. Retrieved from <https://www.loaddelivered.com/blog/why-blockchain-is-a-game-changer-for-supply-chain-management/> on Dec. 1, 2018. Originally published Jan. 28, 2016.*

"Blockchain enabled Trust & Transparency in supply chains". Hua et al. Retrieved from https://www.pdf-archive.com/2017/02/01/project-thesis-anders-j-rgen/project-thesis-anders-j-rgen.pdf on Dec. 1, 2018. Published Feb. 1, 2017.*

Satoshi Nakamoto, "Bitcoine: A Peer to Peer Electronic Cash System," http://bitcoin.org/bitcoin.pdf, 2008, 9 pages.

* cited by examiner

INFORMATION MANAGEMENT SYSTEM USING BLOCKCHAIN FUNCTIONALITIES

FIELD

The field relates generally to information management systems, and more particularly to techniques for asset tracking and auditing in such systems.

BACKGROUND

In most manufacturing companies, existing supply chain management and asset tracking application ecosystems are the result of decades of evolution, with different systems being upgraded at different times, causing varying degrees of integration between the various components of the ecosystem. These various degrees of integration and the duplication of data limit the functionalities such applications can offer to both internal and external customers. In fact, these limitations as well as others typically exist for any entity that attempts to electronically track and audit assets.

SUMMARY

Illustrative embodiments of the invention provide techniques for managing the tracking and auditing of assets by integrating blockchain functionalities into information management systems.

For example, in one embodiment, an apparatus comprises one or more processing devices operatively coupled to form an information management system. The information management system comprises a blockchain infrastructure configured to maintain a blockchain for one or more smart contracts generated for one or more assets managed by the information management system, and one or more application programming interfaces configured to provide access to the one or more smart contracts of the blockchain enabling input of data to a given smart contract for a given asset and retrieval of data from the given smart contract of the given asset.

Advantageously, illustrative embodiments integrate one or more aspects of a block chain blockchain protocol within an information management system thereby providing an asset platform architecture that enables significantly improved tracking and auditing of such assets.

These and other illustrative embodiments include, without limitation, methods, apparatus apparatuses, systems, computer networks and computer program products comprising processor-readable storage media.

DETAILED DESCRIPTION

Illustrative embodiments of the present invention will be described herein with reference to exemplary information management systems, and associated computers, storage devices and other types of processing devices of computer networks. It is to be appreciated, however, that the invention is not restricted to use with the particular illustrative information management systems and processing device configurations shown. Accordingly, the term "information management system" as used herein is intended to be broadly construed, so as to encompass, for example, any system comprising multiple networked processing devices.

As used herein, the term "asset" illustratively refers to one or more items that an entity (e.g., a company, an individual, a group, etc.) seeks to manage via an information management system. By way of example only, for a data storage product supplier, an asset may be any hardware component, part, assembly, system, and/or any software module, code, program, system, that the data storage product supplier may seek to track and audit.

As mentioned above in the background section, current supply chain management and asset tracking ecosystems are comprised of a plethora of applications, deployed at various times within the evolution of a company. These disparate applications from different vendors offer varying degrees of integration with each other, resulting in information silos. An information silo is an information management system incapable of reciprocal operation with other related information management systems. These information silos prevent a company from having a holistic view of its resources and reduces the productivity of many of its employees.

More particularly, such numerous existing applications, which form the supply chain management and asset tracking ecosystem for a company, are designed according to the traditional 3-tier application model, i.e., each application has a presentation layer, an application logic layer and a database layer. Unfortunately, each application has its own database, with its own schema, making it difficult to share data between them, thus creating information silos. This in turn causes issues for the company to keep track of what is being shipped, which component is installed where, what software titles are being deployed on which systems, etc.

Because of the multiple versions of data stored in the various information silos, existing ecosystems are not able to keep up with consumption models in accordance with customer expectations. As illustratively used herein, a "consumption model" is a model that defines the cost of resources consumed by a customer.

One example of an information silo is one which provides information relating to hardware components of a system but not its software components. Such information silos force employees to access different systems to obtain a complete picture of an asset. These disjointed efforts lower the productivity of employees and are a significant source of errors. These errors translate into loss of revenue and margin.

Another example of the effect of information silos is an installation database and more importantly, its accuracy. Its accuracy is such that a quotation application that utilizes the installation database does not co-term any quote because the maintenance period recorded into the installation database is known to be grossly inaccurate. This inaccurate source of information creates delays in the quoting process, which in turn translates into lengthy turn-arounds for quotes.

Furthermore, customers expect new consumption models for the hardware and software they utilize. Due to their traditional architecture, the applications in existing ecosystems do not offer a granular enough level of data to enable these new consumption models. For instance, in a scenario where disk drives are being tracked, TOPS (input/output operations per second) based metering and billing cannot be achieved because existing asset tracking and billing systems are unable to securely and immutably record TOPS at a drive level. However, it is not just new consumption models that are showing the limits of existing systems, but also current consumption models.

With current advances in technology, hardware architectures are evolving with more flexible models than the traditional storage architecture based on controllers, drives and disk shelves. The same advances are also changing the traditional server model, built on the concept of central processing units (CPUs), memory and cards fixed to a motherboard. Thus, the current asset tracking and supply chain management ecosystems struggle to keep up with these new more flexible hardware architecture models.

Illustrative embodiments overcome the above and other drawbacks associated with existing information management systems by providing information management systems that track and audit assets by integrating blockchain functionalities into information management systems. In illustrative embodiments, a smart contract is an example of an application running on a blockchain architecture.

As illustratively used herein, a "blockchain" is a secure, immutable and distributed electronic ledger. Records are added to the ledger in the form of a transaction. A transaction is first verified by the nodes in the blockchain network and only when consensus, i.e., at least 50% of the nodes have reached the same result, is a transaction committed to the ledger. This form of consensus is extremely resistant to cyberattacks, as at least 50% of the nodes in the network would need to be breached at the exact same time for the attack to be successful. Once a transaction is committed to the ledger, it cannot be changed or updated in any way, shape, or form. If a malevolent entity attempts to change the transaction, the blockchain will automatically detect such attempt and will not commit the changes to the transaction. Transactions are stored cryptographically encrypted, making it next to impossible for external entities to decipher the data contained in the blockchain.

The blockchain protocol allows for two parties in a computer network to transact directly with each other without a trusted third party, see, e.g., S. Nakamoto, "Bitcoin: A Peer to Peer Electronic Cash System," 2008, the disclosure of which is incorporated by reference herein in its entirety.

Protocols such as blockchain accomplish this level of trust by creating distributed, secure, and timestamped blocks of transactions throughout the computer network. Linked chains of these blocks are maintained by a trusted community of participants that forego the use of a third party to validate trust via the community. The financial community has taken to calling blockchain implementations distributed ledgers. As is known, the blockchain or digital ledger protocol is implemented via a distributed, decentralized computer network of compute nodes. The compute nodes are operatively coupled in a peer-to-peer communications protocol. In the computer network, each compute node is configured to maintain a blockchain which is a cryptographically secured record or ledger of data blocks that represent respective transactions within a given computational environment. The blockchain is secured through use of a cryptographic hash function. A cryptographic hash function is a cryptographic function which takes an input (or "message") and returns a fixed-size alphanumeric string, which is called the hash value (also a message digest, a digital fingerprint, a digest, or a checksum). Each blockchain is thus a growing list of data records hardened against tampering and revision, and typically includes a timestamp, current transaction data, and information linking it to a previous block. More particularly, each subsequent block in the blockchain is a data block that includes a given transaction and a hash value of the previous block in the chain, i.e., the previous transaction. Thus, advantageously, each data block in the blockchain represents a given set of transaction data plus a set of all previous transaction data.

As illustratively used herein, a "smart contract" is a computer protocol that facilitates, verifies, or enforces the negotiation or performance of a contract. Smart contracts can store any data required for the execution of the contract. Smart contracts typically also have a user interface and emulate the logic of contractual clauses. Smart contracts are autonomous, fully self-executing and self-enforcing logic modules and/or data structures. In illustrative embodiments, as will be described herein, smart contracts are created and maintained for one or more assets being tracked and audited through an information management system configured with blockchain functionalities.

More particularly, illustrative embodiments provide asset tracking and auditing in an information management system that integrates blockchain technology. Smart contracts are an example of applications (e.g., logic modules and/or data structures comprised of software) running on a blockchain architecture. Such an information management system is configured to tie every asset shipped by a company, whether it is a hardware asset, a software asset, or combinations thereof, with a smart contract. The system is configured to provide granularity down to a single asset such as, for example, a drive or a single LCC (link control card). Using blockchain technology to power the smart contract, irrefutable historical details are kept and follow the asset through its entire lifecycle, from inception to retirement or decommission.

As will be further explained, each asset contains and/or is assigned one or more embedded agent/clients (e.g., module, applet, etc.) that communicate and transact on a blockchain powered private chain back to the information management system. These agents/clients transfer metrics and details about the asset back and forth between the assets and the information management system. Encryption, which is a native attribute of the blockchain technology, allows these transfers to happen in a completely secure manner. Assets that do not have an embedded agent/client communicate with the information management system via one or more gateway devices.

By running smart contracts, which store all of the details and metrics associated with an asset, the private blockchain becomes the single source of accurate information (i.e., truth) for all systems that access the information management system such as, but not limited to, supply chain management and/or asset tracking systems. Some examples of the details stored in the smart contract are serial number, location, i.e., install site, customer data, maintenance contract, license keys for software entitlements asset history, etc. Any additions, subtractions, or other changes to the asset are required to submit a secured transaction back to the private chain for validation before updating the smart contract associated with the asset. Once recorded, these transactions remain with the asset and its smart contract in a secure unmodifiable historical record, offering a single source of accurate information for everything related to the asset. Smart contracts are respectively maintained for each asset in a composition of assets, as well as for the composition itself.

Figure 1:
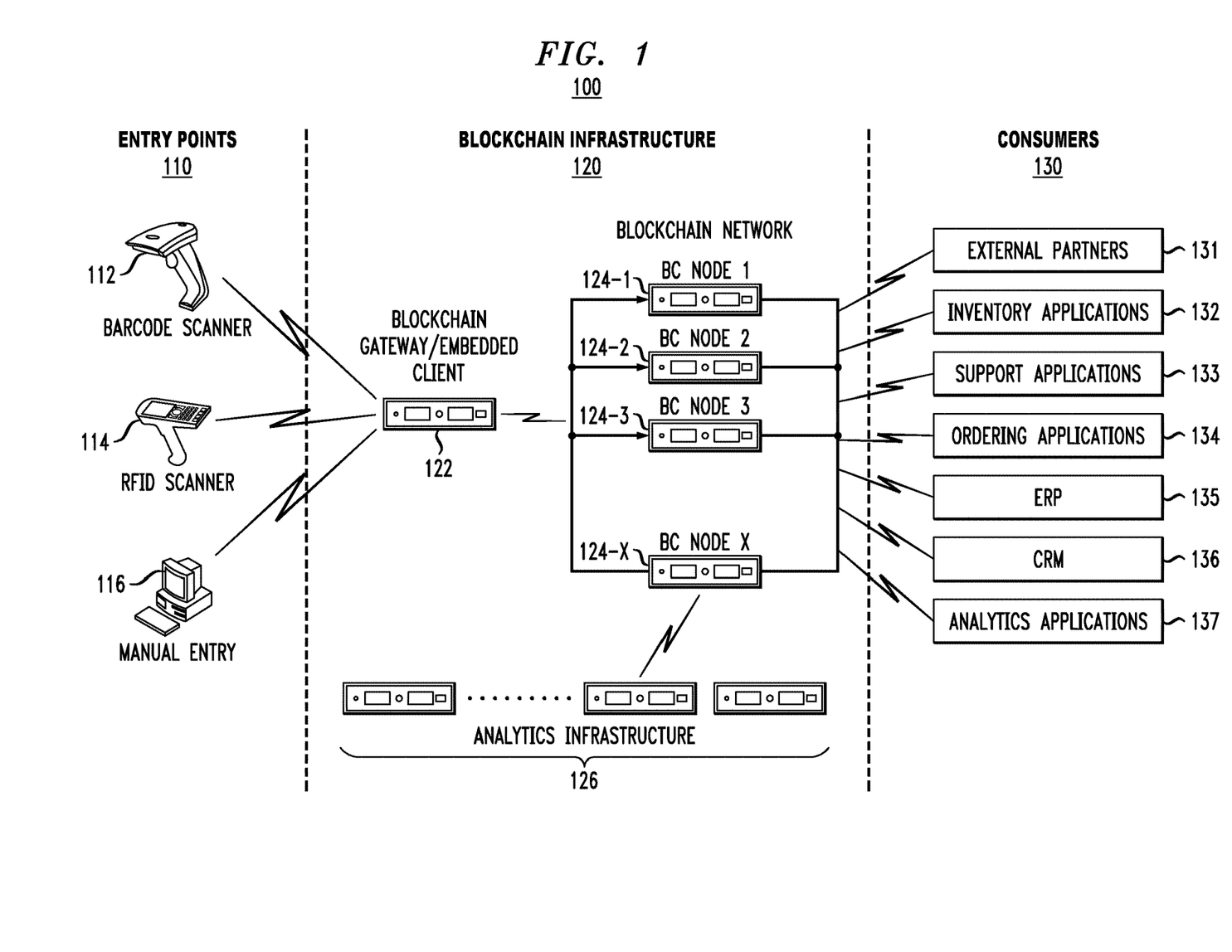
FIG. 1 illustrates an information management system environment configured with blockchain functionalities for asset tracking and auditing in accordance with an illustrative embodiment.

FIG. 1 illustrates an information management system environment 100 configured with blockchain functionalities for asset tracking and auditing in an illustrative embodiment. More particularly, as shown, information management system environment 100 comprises entry points 110 operatively coupled to blockchain infrastructure 120, and consumer components 130 also operatively coupled to the blockchain infrastructure 120.

In the illustrative embodiment shown, entry points 110 comprise a plurality of entry points including, but not limited to, a bar code scanner 112, an RFID (radio frequency identification) scanner 114, and manual entry 116 (e.g., computer device). The plurality of entry points serve as the input for transaction data to be submitted to the blockchain infrastructure 120. While a single bar code scanner, RFID scanner, and a manual entry point are illustrated in FIG. 1, it is to be appreciated that multiple such entry point types, as well as other types of entry points not expressly shown, can be part of the information management system environment 100.

Blockchain infrastructure 120, as per the illustrative embodiment shown in FIG. 1, comprises a blockchain gateway/embedded client 122 operatively coupled to a plurality of blockchain (BC) nodes 1, 2, 3, . . . , X denoted as 124-1, 124-2, 124-3, . . . , 124-X. It is to be appreciated that while a single blockchain gateway/embedded client 122 is shown, the information management system environment 100 comprises a plurality of such gateways/embedded clients. As mentioned above, some assets may have an embedded client residing thereon while other assets do not. In the case of the latter, the assets communicate with the blockchain infrastructure via one or more gateway devices. Also, as shown, the plurality of blockchain nodes 124-1, 124-2, 124-3, . . . , 124-X are operatively coupled to analytics infrastructure 126. As will be explained in further detail herein, the blockchain infrastructure 120 hosts a blockchain software layer upon which native applications, a smart contract framework, and an analytics framework are executed to manage (e.g., track and audit) assets via transaction data received through entry points 110.

Consumers of the information managed by the blockchain infrastructure 120 are denoted in the illustrative embodiment of FIG. 1 as a plurality of consumer components including, but not limited to, external partners 131, inventory applications 132, support applications 133, ordering applications 134, enterprise resource planning (ERP) 135, customer relationship management (CRM) 136, and analytics applications 137. Consumer components 132 through 137 may be considered internal consumers since they are systems and applications typically internal to the company. External partners 131 are typically external to the company.

Figure 2:
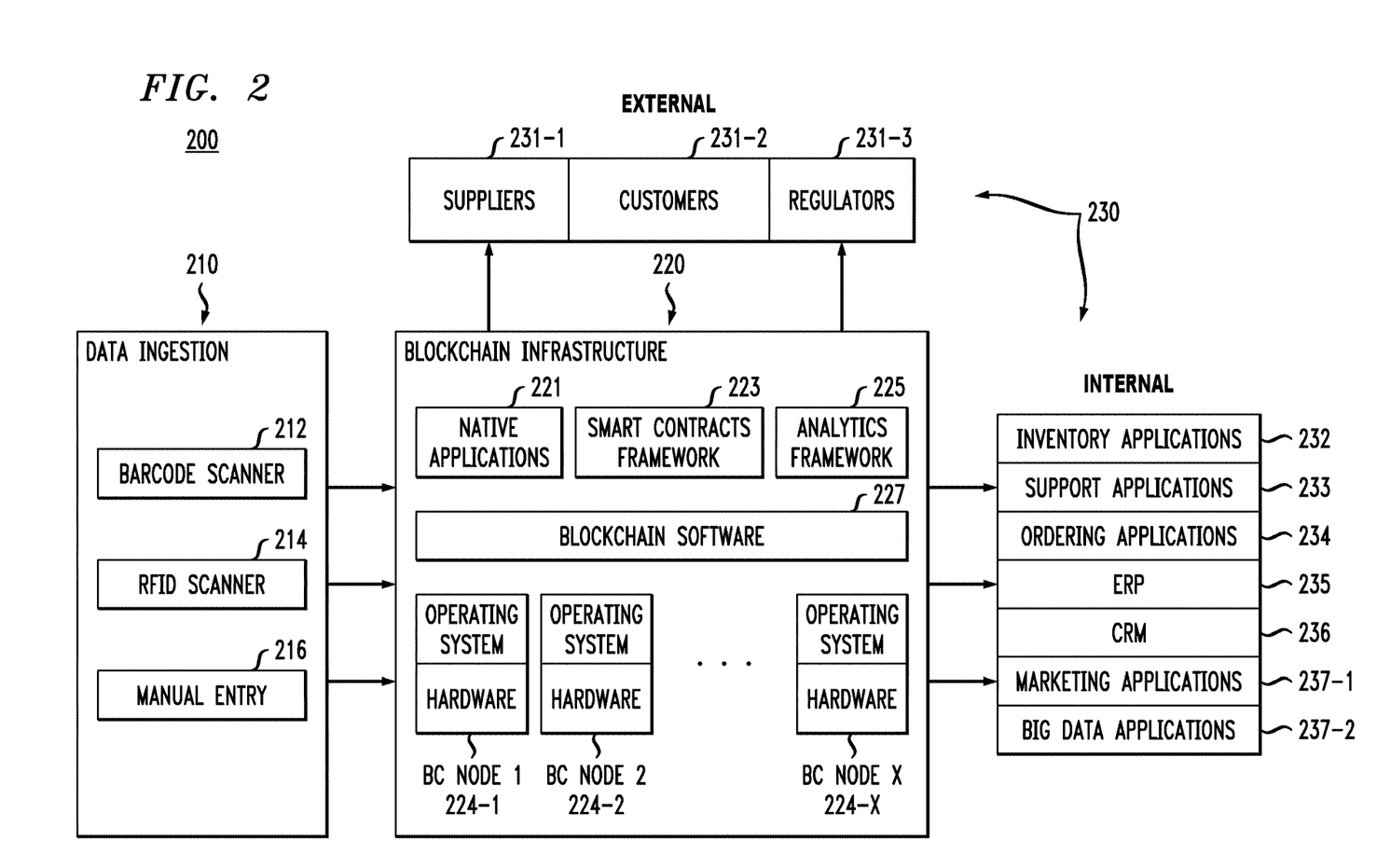
FIG. 2 illustrates further details of an information management system environment configured with blockchain functionalities for asset tracking and auditing in accordance with an illustrative embodiment.

FIG. 2 illustrates further details of an information management system environment 200 configured with blockchain functionalities for asset tracking and auditing in accordance with an illustrative embodiment. It is to be appreciated that the information management system environment 200 in FIG. 2 is similar to the information management system environment 100 in FIG. 1 whereby the entry points 100 (FIG. 1) correspond to data ingestion 210 (FIG. 2), blockchain infrastructure 120 (FIG. 1) corresponds to blockchain infrastructure 220 (FIG. 2), and consumer components 130 (FIG. 1) correspond to consumer components 230 (FIG. 2).

Thus, consistent with entry points 110, data ingestion 210 comprises a barcode scanner 212, an RFID scanner 214, and manual entry 216. Again, these data input components represent examples of mechanisms with which transaction data associated with each asset being tracked and audited may be input to the blockchain infrastructure 220. Likewise, consistent with consumer components 130, consumer components 230 comprise external consumers including suppliers 231-1, customers 231-2 and regulators (e.g., auditors) 231-3, as well as inventory applications 232, support applications 233, ordering applications 234, ERP 235, CRM 236, and analytics applications including marketing applications 237-1 and big data applications 237-2.

Blockchain infrastructure 220 illustrates functional details of the blockchain infrastructure 120. More particularly, as shown in the illustrative embodiment of FIG. 2, native applications 221, smart contracts framework 223, and analytics framework 225 execute on blockchain software layer 227, as will be further explained below. The applications and software (221 through 227) execute on each of the blockchain nodes 224-1, 224-2, . . . , 224-X. As illustratively shown, each blockchain node comprises an operating system executing on hardware (e.g., processor and memory). The blockchain nodes 224-1, 224-2, . . . , 224-X may be implemented with virtual infrastructure in one or more illustrative embodiments. Native applications may include any web-based or mobile-based applications interacting with the underlying blockchain software. Analytics framework may be any ecosystem of applications and processes that perform analytics on data either stored in the blockchain or exported out of the blockchain. Example applications and frameworks will be described in further detail below in the context of further illustrative embodiments.

Figure 3:
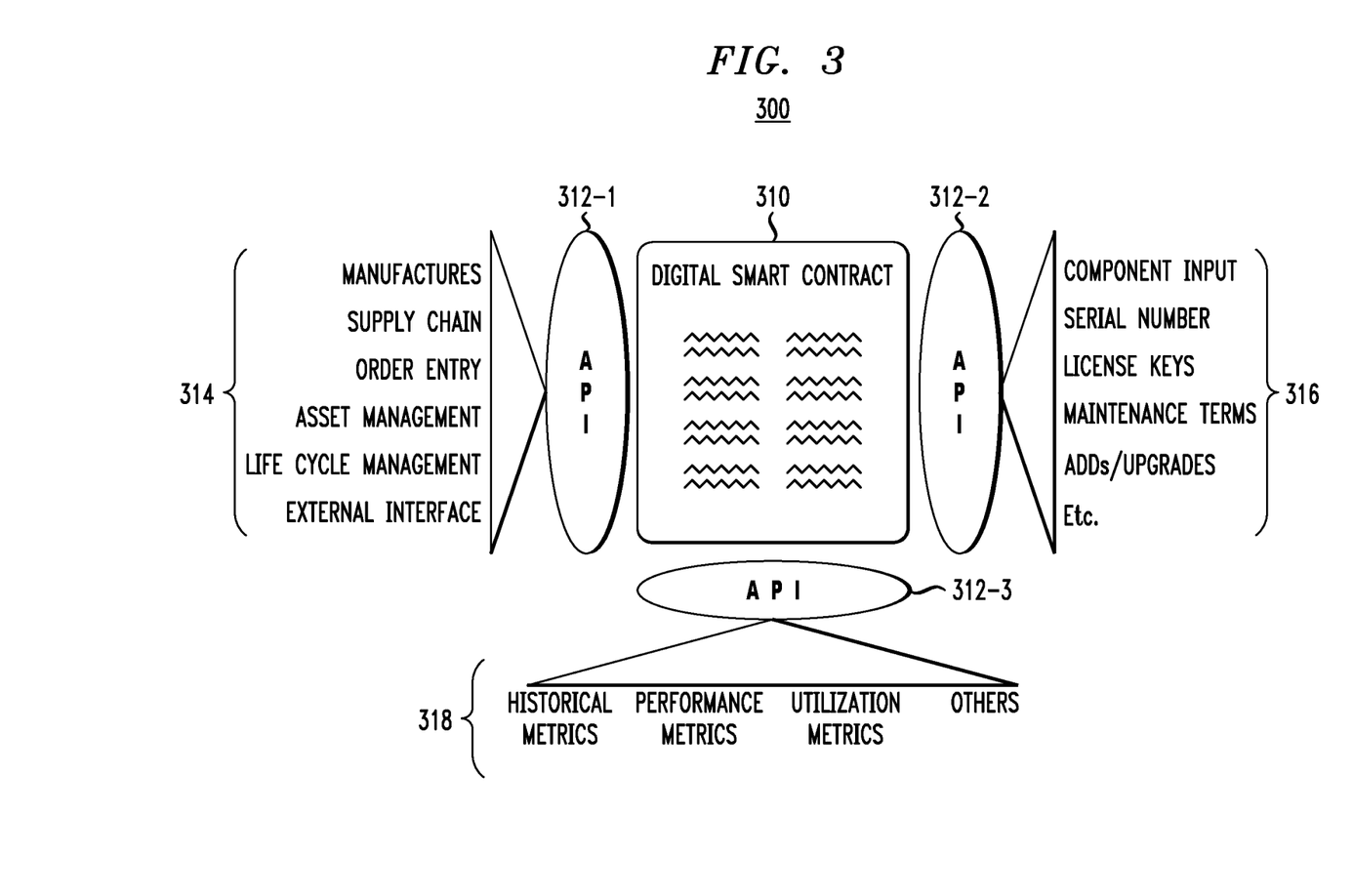
FIG. 3 illustrates a smart contract environment with smart contract and application programming interfaces in accordance with an illustrative embodiment.

FIG. 3 illustrates a smart contract environment 300 with a smart contract and application programming interfaces in accordance with an illustrative embodiment. More particularly, FIG. 3 depicts an example of a portion of smart contract framework 223 which executes on blockchain software layer 227. As shown, an electronic (digital) smart contract 310 is accessible via a plurality of application programming interfaces (APIs). For example, as illustratively depicted in the embodiment of FIG. 3, API 312-1 receives transaction data 314 for use by the smart contract 310 such as manufacturer data, supply chain data, order entry data, asset management data, life cycle management data, and data from external interfaces. Further, API 312-2 receives transaction data 316 for use by the smart contract 310 such as component input data, serial number data, license key data, maintenance term data, add/upgrade data, etc. Still further, API 312-3 receives transaction data 318 for use by the smart contract 310 such as historical metric data, performance metric data, utilization metric data, as well as other metric data. It is to be appreciated that transaction data sets 314, 316 and 318 are data sets that are related to the given asset for which smart contract 310 is created and maintained. The APIs 312-1, 312-2, and 312-3 are configured to provide access (input and output) with respect to the smart contract 310 consistent with the specific types of transaction data and the specific protocol requirements or preferences of the smart contract 310. One of ordinary skill in the art will realize the API configurations given the specific types of transaction data and the specific protocol requirements or preferences of the smart contract being created and maintained by the blockchain infrastructure 220.

It is to be understood that the smart contract 310 and all its attributes (transaction data 314, 316, and 318) becomes the single source of truth (accurate information) for a given asset since the smart contract manages these attributes in a blockchain created and maintained via the blockchain software layer 227.

For example, when new transaction data (transaction) is received by the smart contract 310 for a given asset, the transaction is first verified by the blockchain nodes 224-1, 224-2, . . . , 224-X and only when consensus, i.e., at least 50% of the nodes have reached the same result (e.g., the transaction is verified as legitimate), is the transaction committed to the blockchain. As mentioned above, this form of consensus is extremely resistant to cyberattacks, as at least 50% of the nodes in the network would need to be breached at the exact same time for the attack to be successful. Once a transaction is committed to the blockchain, it cannot be falsely changed or updated without being detected. Transactions are stored cryptographically encrypted, making it next to impossible for external entities to decipher the data contained in the blockchain.

This accurate information for each smart contract in the blockchain is then leveraged by all the applications, e.g., native applications 221, analytics framework 225, as well as all consumer components 230, in the information management system environment 200. Each application communicates with the smart contract 310 through the set of APIs 312-1, 312-2, and 312-3 and consumes only the data relevant to the functions the application performs. Because of the immutable nature of the transactions stored into the blockchain and the cryptography associated with the blockchain, this single source of truth contains a verifiable, unchangeable and fully secure historical record of every actions ever performed on an asset.

It is to be appreciated that a smart contract 310 both receives data from and serves data to internal and external systems. Such internal and external systems exist independent of the smart contract 310 and blockchain infrastructure 220 and thereby enhance the performance of the internal and external systems by maintaining a single immutable source of accurate information for any given asset.

More particularly, an information management system according to the illustrative embodiment of FIG. 2 utilizes smart contracts to optimize the process of asset tracking. Such optimization is obtained because a dedicated smart contract is tied to a given asset, which as mentioned can be a physical asset, a software asset, or some combination thereof. The smart contract tracks any components and subcomponents through their hardware identifiers (IDs) and/or serial numbers. This information can be scanned by any one of the data ingest types shown in FIG. 2 (as well as others not expressly shown). Historical records of any additions, removals, or modifications associated with the given asset are instantly recorded in an immutable form by the blockchain software. This not only secures the entire lifecycle tracking process, but also simplifies the reporting and tracking of all aspects of the given asset. Additionally, all changes occurring on the asset can be instantly pushed via a secure transaction request back to any internal or external system to allow for seamless integration and updating of records. Smart contract 310 is flexible enough to track assets as simple as a hard drive, a CPU, an LCC or a software license or as complex as an entire storage array or server.

By optimizing the tracking of assets, an information management system according to illustrative embodiments enhances the supply chain process considerably. Asset moves are now more easily tracked and verified by reporting new locations after transfer. This is a security measure that can be built into the power down and power on process of the asset. Additionally, when tracking at the component level, an immutable record of the manufacturing origin, component receiving, quality control process, cataloging, installation, and eventual deployment of the asset can now easily be recorded and verified at every step of the process.

By utilizing smart contracts, an information management system according to illustrative embodiments significantly improves the management of assets, as it creates an immutable historical record of an asset's lifecycle. This record allows the tracking of many attributes of the asset, such as, but not limited to, the purchased maintenance enablement, the date of manufacturing, the date of implementation, the initial build, any components added, sales order numbers and license keys purchased and activated.

The management of the lifecycle of an asset is also improved, by an information management system according to illustrative embodiments, through the historical record of all the transactions issues against the smart contract tied to the asset.

Through the creation of a single verifiable, immutable and complete data repository, an information management system according to illustrative embodiments improves a number of processes, such as the quoting of solutions, the renewal of maintenance contracts or inventory tracking. Instead of relying on information silos, these processes can now leverage a single source of truth, in the form of the smart contract 310. This enhances process optimization by increasing efficiency, reducing potential errors, and integrating systems with a single system of truth for transactions.

An information management system according to illustrative embodiments utilizes a smart contract 310 to enhance reporting on an asset, as it records metrics such as utilization, consumption, and/or performance onto a single chain on the blockchain. This enables a very granular level of monitoring and reporting on assets. Such a wealth of data can be leveraged internally for predictive maintenance and externally by customers through various tools such as, but not limited to, storage resource management tools or tools for detailed visualization.

By tying smart contracts with assets and recording metrics, such as performance and utilization, an information management system according to illustrative embodiments enables the creation of true utility-based consumption models. As those metrics are immutably and securely recorded in the smart contract, those records create an exhaustive and verifiable history of the usage of the asset. This history can be used by billing systems to accurately charge customers for the usage of the asset.

By creating a single repository of all the attributes of every asset and the associated actions performed on the asset, an information management system according to illustrative embodiments is the basis for advanced analytics (e.g., analytics framework 225, marketing applications 237-1, big data applications 237-2, etc.) on components and/or part failures, on supply chain issues and on utilization and consumption metrics. The level of detail provided by an information management system according to illustrative embodiments can be used by our organization to more accurately and efficiently improve upon current issues and to potentially identify new issues before they occur.

From a product innovation and enhancement perspective, this blockchain powered solution according to illustrative embodiments extends all of the above-mentioned data and metrics to yet another facet of a business, i.e., research & development (R&D), and innovation. Having a view into not only performance, and similar issues, but also consumption and utilization, allows for changes or new ideas around how to address customer needs and use cases. This information can be shared across all business units of a company as well as engineering to help innovate and improve products to customers leveraging verifiable metrics.

Given the description above of an information management system environment configured with blockchain functionalities for asset tracking and auditing in accordance with an illustrative embodiment, some examples will now be described illustrating how such improved information management enhances supply chain and asset tracking processes. The examples are given to illustrate the flexibility and applicability of the illustrative embodiments to single information technology (IT) components, such as a hard drive, to more complex IT components, such as a storage array, to an entire IT infrastructure, such as a composable infrastructure. Further, an example is given for a non-IT asset.

A first example illustrates use of an information management system environment configured with blockchain functionalities with respect to a hard drive as the given asset, and how the smart contract solution impacts the hard drive lifecycle. The example will be described in the context of flow chart 400 of FIG. 4. It is assumed that the company maintaining the information management system environment is a storage solution provider.

Figure 4:
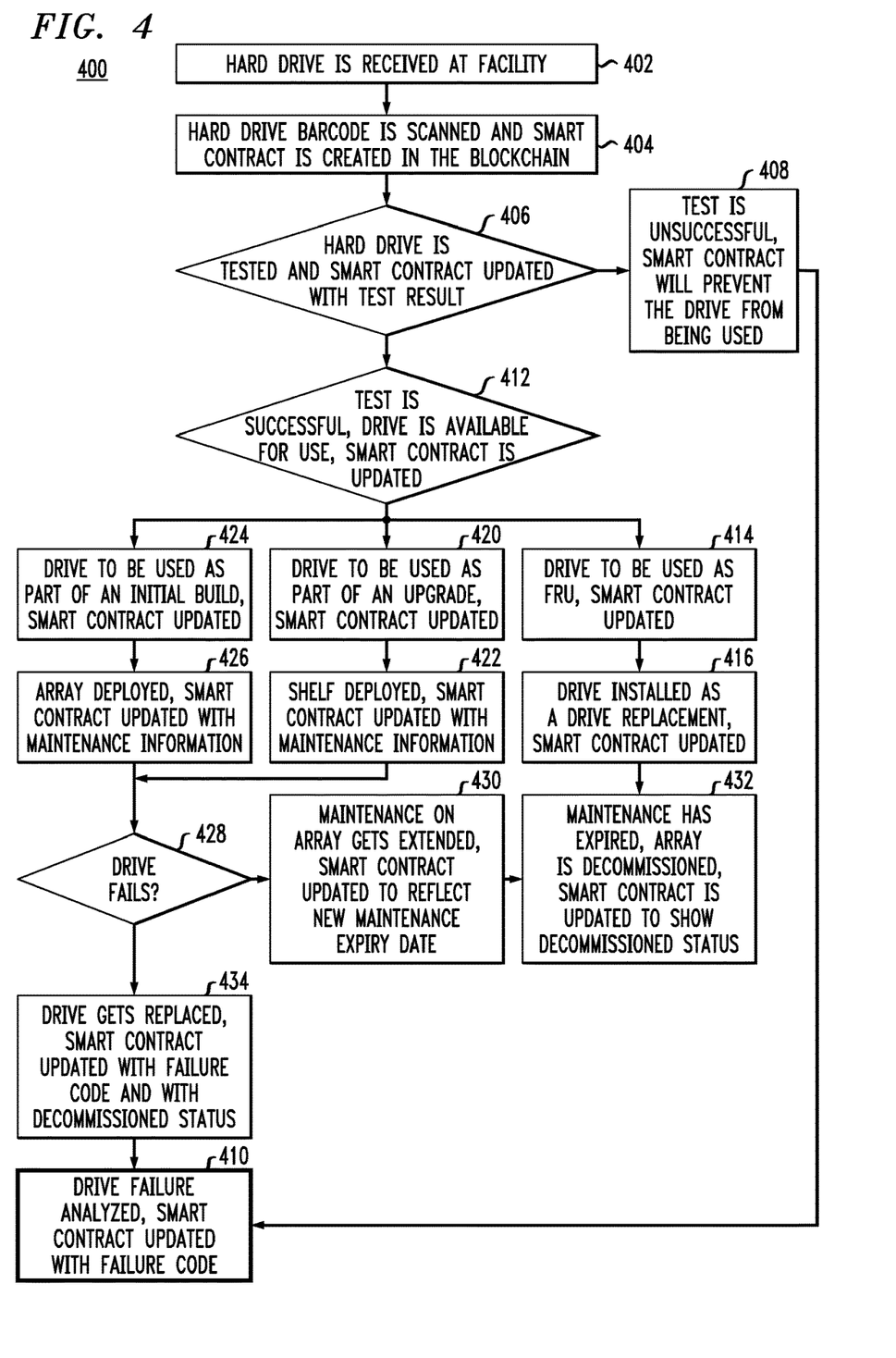
FIG. 4 illustrates a process for information management with blockchain functionalities in accordance with one illustrative embodiment.

An initial step in the process is the creation of the smart contract for a given drive. As drives are received within the facilities of the storage solution provider (step 402), the barcode of the drive is scanned (e.g., barcode scanner 212) and the smart contract associated with the drive is created in a blockchain (step 404) associating drives attributes such as, for example, serial number, capacity and speed with the smart contract.

Once drives are inventoried, they usually go through some form of testing to ensure they are not non-functional upon arrival. Once the testing is done, the smart contract associated with the drive is updated with the test result (step 406). If the drive does not pass the test (step 408), then the smart contract is updated with the failure code (step 410). Because the blockchain stores all the transactions against the smart contracts of all drives received by the storage solution provider, it is possible for the storage solution provider to find trends in drive failures and use that information to negotiate better deals with drive suppliers.

If the drive has passed the test (step 406), the smart contract is updated to reflect this and the drive is marked as being available to be used in the field (step 412). At this point, the drive can be used in three different situations:

It can be used as a field replacement unit (FRU);
It can be used as part of a storage upgrade; and
It can be used as part of the initial configuration of an array.

If the drive is to be used as an FRU (step 414), when it replaces a failed drive, its smart contracts gets updated (step 416) with the maintenance information and the site information of the drive it replaces.

If the drive is used as part of an upgrade (shelf deployed) to a storage array (step 420), a (separately created) smart contract of the array gets updated with the new drive information and the smart contract of the drive gets updated with the array information such as maintenance period or site information (step 422).

If the drive is to be used as part of the initial configuration (build) of an array (step 424), tools can generate XML files which can be used to instantiate the smart contract of the array and the smart contracts of all the associated components. Once the asset is deployed in the field, its smart contract and all associated smart contracts get updated with the relevant information (step 426).

These smart contracts are updated throughout the lifecycle of the asset, allowing for a complete tracking of all changes, upgrade, replaced failed parts, etc. Having maintenance information at the component level also allows the company to tailor the maintenance cost to the actual configuration of an asset.

At the end of the maintenance period, if the drive has not failed (step 428) and if the maintenance is renewed, then the smart contract of the drive and its asset are updated with the new maintenance information (step 430). At the end of that period, the drive will be decommissioned and its smart contract updated with that information (step 432). Likewise, if the drive fails (step 428), the drive is replaced and the smart contract of the failed drive gets updated with the failure code and with its decommissioned status (step 434).

Because blocks in the blockchain cannot be deleted, the blockchain contains a full history of all the assets and components that will ever be deployed, offering us an extremely rich insight to the company.

Another aspect in which an information management system according to illustrative embodiments can impact a single drive is in its ability to record performance details about the drive. These details can further be used to design a utility-based consumption model as all the details necessary to perform such billing are stored in the blockchain in an immutable way.

Another example of the beneficial impacts of the smart contract-based blockchain infrastructure described herein relates to an entire storage array. One of these impacts is around maintenance. With today's processes, maintenance on a storage array is built at the frame level, meaning that an entire array is either under maintenance or not, but the array is an undividable entity. In accordance with illustrative embodiments described herein whereby every single component of an array is associated with a smart contract, maintenance does not have to be an all or nothing, but only a specific component of an array could be placed under maintenance, such as a number of engines with a number of associated drives. This gives customers significant flexibility compared to the existing maintenance model.

Another beneficial impact relates to the development of a utility-based consumption model for an entire storage array. Through an agent deployed within the storage array operating system, illustrative embodiments gather extremely granular metering data and that data is stored in the blockchain for billing purposes.

Yet another beneficial impact relates to decentralized configuration management and reporting with respect to storage arrays. Illustrative embodiments enable the recording of every single action on a storage array and centrally stores all of these records. These records can then be queried by various systems to quote an upgrade to a customer and ensure existing configurations are accurate, to enable customers to get an accurate view of their storage arrays, or to validate upgrades in the field against what was designed.

When a quote to upgrade a storage array is generated by a quoting application, as the serial number of the array is entered by the person creating the quote, the application gathers the last configuration of the array, including hardware, software and maintenance information, from the blockchain and automatically populates the existing configuration with that information. This will avoid the person creating the quote incorrectly entering such information, which often leads to issues further down the line. Such issues are typically resolved, for better or worse, through either a return merchandise authorization (RMA) process, a complaint department, or through loss of future orders. Once the customer issues a purchase order for the upgrade, the ordering process books the order and a solution architect gets assigned to design the new upgrade configuration. The smart contract for the array stores the new configuration and when the customer service engineer goes on site to physically install the upgrade, the operating system of the array, through a built-in agent, validates the upgrade against the one in the smart contract and allows the upgrade only if both match.

The purpose of this validation is to reduce human error in the field by having the storage array itself validate that the installed configuration matches the planned configuration. This can also be used to validate disruptive actions, such as reboot, against the blockchain to ensure that the correct array is being rebooted, thus lowering the percentage of unplanned downtime and human error. Both of these are significant factors in customer satisfaction and avoiding or minimizing them positively impacts the way customers see the quality of services of a company.

Another example of the beneficial impacts of the smart contract-based blockchain infrastructure described herein relates to even higher-level entities such as composable infrastructures.

Composable infrastructures are a fairly new concept but one that would significantly benefit from an information management system according to illustrative embodiments. A composable infrastructure is an infrastructure made of flexible components, such as CPU, memory, storage and networking, which are dynamically composed and decomposed based on the workloads running on the infrastructure. A composable infrastructure is able to remove the traditional boundaries of servers and storage arrays as it can be built around trays of CPUs, trays of memory, trays of network interfaces and trays of disks, each being allocated as required by the composer software to meet the requirements of the workloads. Because of this flexibility, a significant challenge around composable infrastructure is keeping track of the various components, their configurations and usage. As described in the above examples, not only are illustrative embodiments able to accurately track asset configuration and usage over time in the blockchain, but they are also able to do so at a very granular level. This granularity is beneficial for composable infrastructure. As an infrastructure is composed and decomposed on the fly to meet the customer's workload requirements, the infrastructure composer process stores all of these changes into the blockchain through the smart contract associated with the composable infrastructure and the smart contracts of all the components.

A further example of the beneficial impacts of the smart contract-based blockchain infrastructure described herein relates to simpler devices such as personal devices. Illustrative embodiments are able to track the configuration of personal devices such as, for example, laptops, desktops and tablets. This tracking is available through an agent/client embedded into the firmware/BIOS of the asset. This client reports usage information, configuration information and performance information back to the central blockchain where the smart contract associated with the asset is stored with all its associated transactions. This entire history of an asset is available to customers to keep better inventory of their assets and plan their refresh cycle more effectively.

Figure 5:
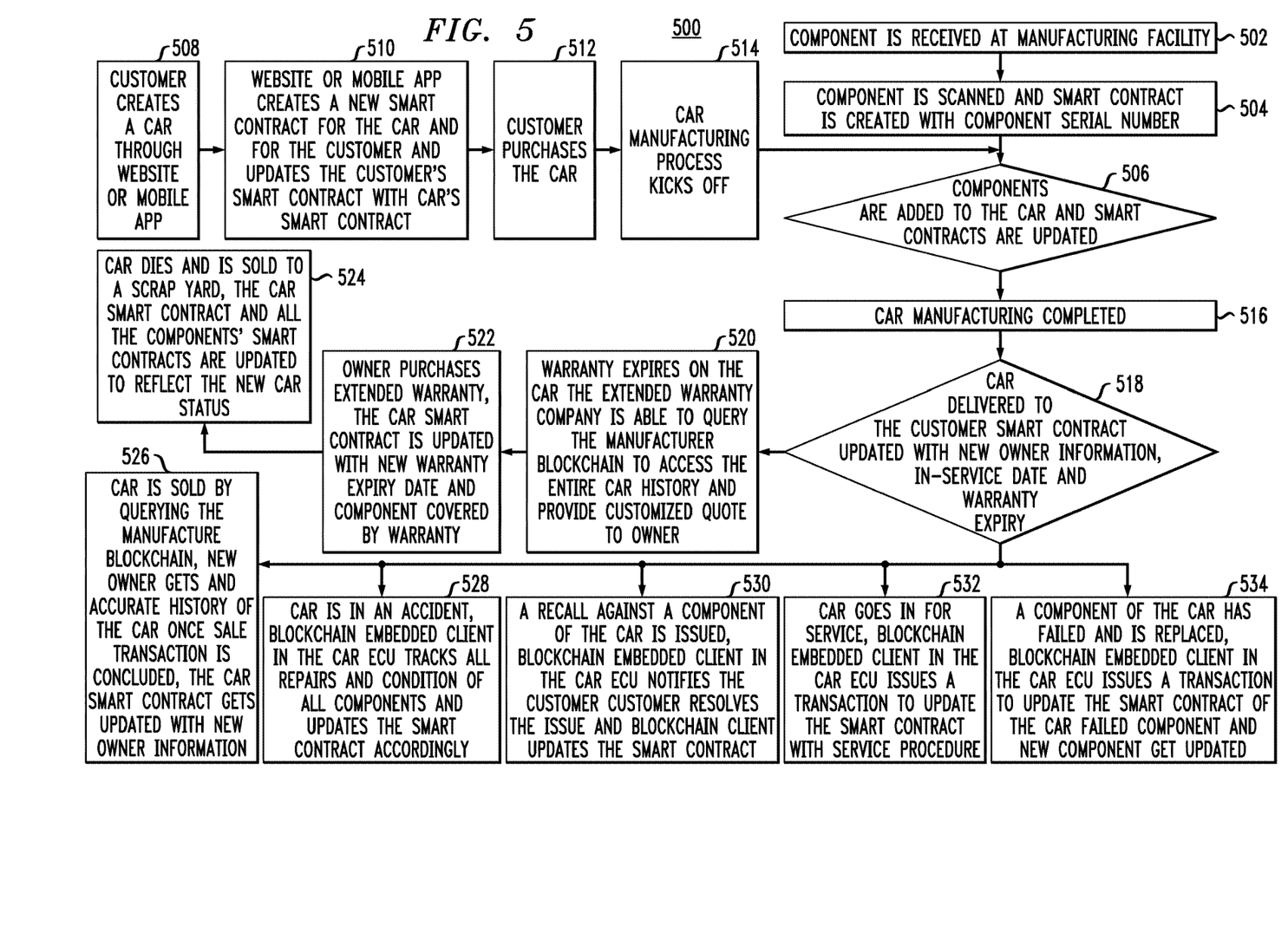
FIG. 5 illustrates a process for information management with blockchain functionalities in accordance with another illustrative embodiment.

FIG. 5 is a flow chart 500 illustrating a non-IT asset example, i.e., a car and its components as assets. Assume a car component is first received at manufacturing facility (step 502). The component is scanned and smart contract is created with the component serial number (step 504). The components are added to the car and the respective smart contracts of the car and components are updated (step 506).

Contemporaneously, a customer creates a car through website or mobile application (step 508). The website or mobile application then creates a new smart contract for the car and for the customer and updates the customer's smart contract with car's smart contract (step 510). The customer then purchases the car (step 512) and the car manufacturing process begins (step 514) where first the components are added to the car and the smart contracts are updated (step 506). After the car manufacturing is completed (step 516), the car is delivered to the customer, and the smart contract is updated with new owner information, in-service date, and the date of warranty expiry (step 518).

When the warranty expires on the car, the extended warranty company is able to query the manufacturer blockchain to access the entire car history and provide a customized quote to the owner (step 520). When the owner purchases an extended warranty, the car smart contract is updated with the new warranty expiry date and components covered by warranty (step 522). When the car dies, and is sold to a scrap yard, the car smart contract and all the components' smart contracts are updated to reflect the new car status (step 524).

When the car is sold, the manufacturer blockchain is queried and the new owner receives an accurate history of the car. Once the sale transaction is concluded the car smart contract is updated with the new owner information (step 526).

When the car is in an accident, the blockchain embedded client in the car electronic control unit (ECU) tracks all repairs and condition of all components and updates the smart contract accordingly (step 528).

When a recall is issued against a component of the car, the blockchain embedded client in the car ECU notifies the customer. The customer resolves the issue and blockchain client updates the smart contract (step 530).

When the car goes in for service, the blockchain embedded client in the car ECU issues a transaction to update the smart contract with service procedure (step 532).

When a component of the car fails, and is replaced, the blockchain embedded client in the car ECU issues a transaction to update the smart contract of the car failed component and the smart contract of the new component is updated (step 534).

It is to be appreciated that at least portions of information management system environment (100, 200, 300, 400 and 500 in the figures) may be implemented using one or more processing platforms. Illustrative embodiments of such platforms will now be described in greater detail in conjunction with FIGS. 6 and 7. Although described primarily in the context of an information management system environment, these platforms may also be used to implement at least portions of other information processing systems in other embodiments of the invention.

Figure 6:
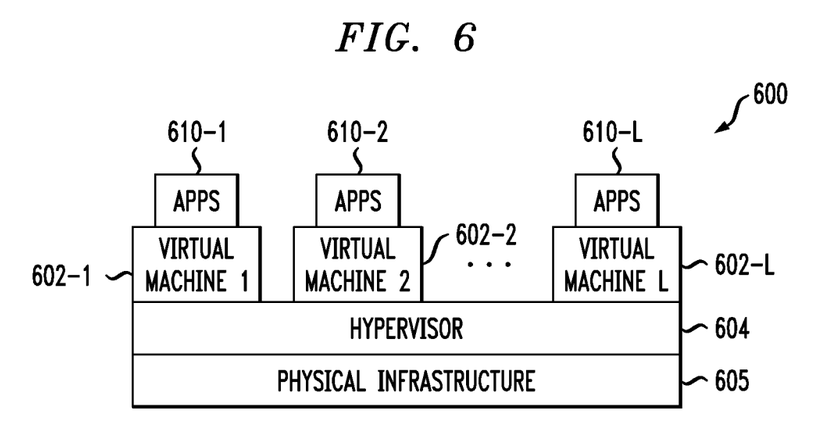
FIGS. 6 and 7 illustrate examples of processing platforms that may be utilized to implement at least a portion of an information management system in accordance with an illustrative embodiment.

FIG. 6 shows an example processing platform comprising cloud infrastructure 600. The cloud infrastructure 600 comprises a combination of physical and virtual processing resources that may be utilized to implement at least a portion of an information management system environment. The cloud infrastructure 600 comprises virtual machines (VMs) 602-1, 602-2, . . . 602-L implemented using a hypervisor 604. The hypervisor 604 runs on physical infrastructure 605. The cloud infrastructure 600 further comprises sets of applications 610-1, 610-2, . . . 610-L running on respective ones of the virtual machines 602-1, 602-2, . . . 602-L under the control of the hypervisor 604.

Although only a single hypervisor 604 is shown in the embodiment of FIG. 6, the computer network 100 may of course include multiple hypervisors each providing a set of virtual machines using at least one underlying physical machine. Different sets of virtual machines provided by one or more hypervisors may be utilized in configuring multiple instances of various components of an information management system environment.

As is apparent from the above, one or more of the processing modules or other components of an information management system environment may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

Figure 7:
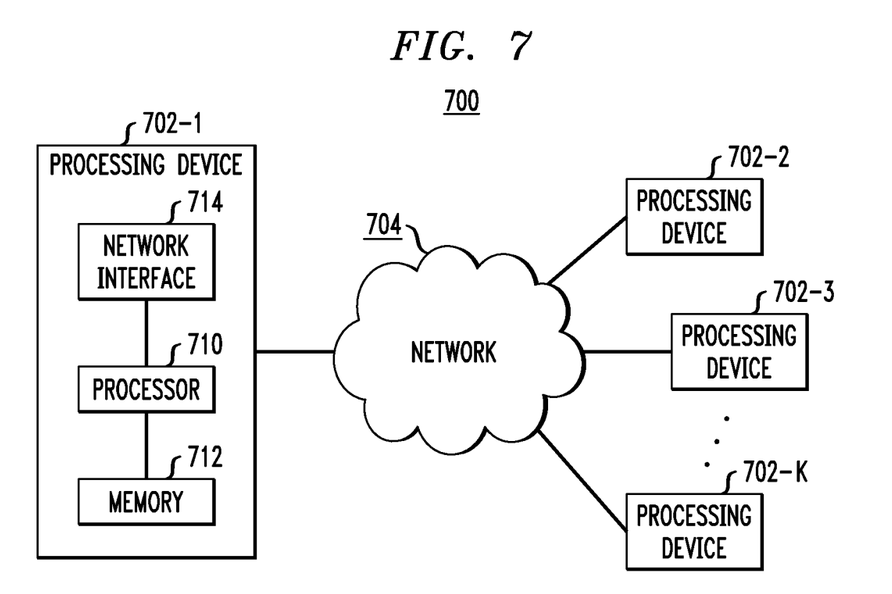

The processing platform 700 in this embodiment comprises a portion of an information management system environment (100, 200, 300, 400 and 500 in the figures) and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

As mentioned previously, some networks utilized in a given embodiment may comprise high-speed local networks in which associated processing devices communicate with one another utilizing PCIe cards of those devices, and networking protocols such as InfiniBand, Gigabit Ethernet or Fibre Channel.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA) or other type of processing circuitry, as well as portions or combinations of such circuitry elements.

The memory 712 may comprise random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also, included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

For example, other processing platforms used to implement embodiments of the invention can comprise different types of virtualization infrastructure, in place of or in addition to virtualization infrastructure comprising virtual machines. Such virtualization infrastructure illustratively includes container-based virtualization infrastructure configured to provide Docker containers or other types of Linux containers (LXCs).

The containers may be associated with respective tenants of a multi-tenant environment, although in other embodiments a given tenant can have multiple containers. The containers may be utilized to implement a variety of different types of functionality in an information management system environment. For example, containers can be used to implement respective cloud compute nodes or cloud storage nodes of a cloud computing and storage system. The compute nodes or storage nodes may be associated with respective cloud tenants of a multi-tenant environment. Containers may be used in combination with other virtualization infrastructure such as virtual machines implemented using a hypervisor.

As another example, portions of a given processing platform in some embodiments can comprise converged infrastructure such as VxRail™, VxRack™ or Vblock® converged infrastructure commercially available from VCE, the Virtual Computing Environment Company, now the Converged Platform and Solutions Division of Dell EMC. For example, portions of a value-based governance system of the type disclosed herein can be implemented utilizing converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information management system environment. Such components can communicate with other elements of the information management system environment over any type of network or other communication media.

As indicated previously, components of a computer network as disclosed herein can be implemented at least in part in the form of one or more software programs stored in memory and executed by a processor of a processing device. For example, at least portions of compute nodes, data storage systems, or other components of a computer network are illustratively implemented in one or more embodiments the form of software running on a processing platform comprising one or more processing devices.

It should again be emphasized that the above-described embodiments of the invention are presented for purposes of illustration only. Many variations and other alternative embodiments may be used. For example, the disclosed techniques are applicable to a wide variety of other types of compute nodes, data storage systems, and other components. Also, the particular configurations of system and device elements, associated processing operations and other functionality illustrated in the drawings can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
one or more assets; and
one or more processing devices operatively coupled to form an information management system, the information management system comprising:
one or more smart contracts generated for the one or more assets;
a blockchain infrastructure configured to maintain a blockchain for one or more smart contracts generated for one or more assets managed by the information management system;
one or more application programming interfaces configured to provide access to the one or more smart contracts of the blockchain enabling input of data to a given smart contract for a given asset and retrieval of data from the given smart contract of the given asset; and
a model representing at least one of usage and consumption for the given asset based on at least a portion of the smart contract data stored in the blockchain;
wherein the given smart contract is individually assigned to the given asset;
wherein the given smart contract is updated for the given asset throughout a lifecycle of the given asset; and
wherein at least a first portion of the one or more assets comprise an embedded client module configured to provide transaction data for the portion of the one or more assets to the one or more application programming interfaces.

2. The apparatus of claim 1, wherein the blockchain infrastructure comprises a plurality of computing nodes configured to execute a blockchain software layer.

3. The apparatus of claim 2, wherein the blockchain software layer is configured to at least one of support a smart contracts framework, support an analytics framework and support one or more native applications.

4. The apparatus of claim 1, wherein the one or more application programming interfaces are configured to receive data from one or more data ingest mechanisms configured to obtain transaction data from the given asset.

5. The apparatus of claim 4, wherein the one or more data ingest mechanisms comprise one or more of a barcode reader, a radio frequency identification scanner, and a manual entry device.

6. The apparatus of claim 1, wherein a dedicated smart contract is individually assigned to each of the one or more assets.

7. The apparatus of claim 6, wherein a given first asset is a part of a given second asset.

8. The apparatus of claim 1, further comprising one or more consumer components;
wherein the one or more consumer components retrieve data from the given smart contract of the given asset.

9. The apparatus of claim 8, wherein the one or more consumer components comprise one or more of a supplier, a customer, and a regulator.

10. The apparatus of claim 8, wherein the one or more consumer components comprise one or more of an inventory application, a support application, an ordering application, an enterprise resource planner, a customer relationship manager, a marketing application, and a data analytics application.

11. A method comprising:
maintaining one or more smart contracts for one or more assets managed by an information management system, wherein the one or more smart contracts reside in a blockchain infrastructure configured to maintain a blockchain for the one or more smart contracts;
accessing the one or more smart contracts via one or more application programming interfaces enabling input of data to a given smart contract for a given asset and retrieval of data from the given smart contract of the given asset; and
generating a model representing at least one of usage and consumption for the given asset based on at least a portion of the smart contract data stored in the blockchain;
updating the given smart contract for the given asset throughout a lifecycle of the given asset;
wherein the given smart contract is individually assigned to the given asset;
wherein at least a portion of the one or more assets comprise an embedded client module configured to provide transaction data for the portion of the one or more assets to the one or more application programming interfaces; and
wherein the maintaining, accessing, and generating steps are executed by one or more processing devices each comprising a processor operatively coupled to a memory.

12. The method of claim 11, wherein the maintaining step further comprises creating the given smart contract for the given asset upon obtaining initial transaction data associated with the given asset.

13. The method of claim 11, wherein the maintaining step further comprises maintaining a dedicated smart contract for each individual asset of a composition of assets, and further including maintaining a dedicated smart contract for the composition of assets.

14. The method of claim 13, wherein the maintaining step further comprises providing a single source of accurate transaction data for the composition of assets and each asset in the composition of assets.

15. A computer program product comprising a non-transitory processor-readable storage medium having stored therein program code of one or more software programs, wherein the program code when executed by at least one processing device causes the at least one processing device to:
maintain one or more smart contracts for one or more assets managed by an information management system, wherein the one or more smart contracts reside in a blockchain infrastructure configured to maintain a blockchain for the one or more smart contracts;

access the one or more smart contracts via one or more application programming interfaces enabling input of data to a given smart contract for a given asset and retrieval of data from the given smart contract of the given asset;

generate a model representing at least one of usage and consumption for the given asset based on at least a portion of the smart contract data of the given smart contract stored in the blockchain; and update the given smart contract for the given asset throughout a lifecycle of the given asset;

wherein the given smart contract is individually assigned to the given asset; and wherein at least a portion of the one or more assets are configured with an embedded client module configured to provide transaction data for the single given asset to the one or more application programming interfaces.

16. The computer program product of claim 15, wherein the program code when executed by at least one processing device causes the at least one processing device to:

create the given smart contract for the given asset upon obtaining initial transaction data associated with the given asset;

maintain a dedicated smart contract for each asset of a composition of assets and for the composition of assets; and provide a single source of accurate transaction data for the composition of assets and each asset in the composition of assets.

17. The apparatus of claim 1, including one or more gateway devices;

wherein at least a second portion of the one or more assets are configured to provide transaction data for the second portion of the one or more assets to the one or more application programming interfaces through the one or more gateway devices.

18. The apparatus of claim 1, wherein:

the one or more assets include information technology components; and wherein the information management system includes software configured to:

dynamically compose a computer infrastructure through selective assignment of the information technology components;

assign a dedicated smart contract for each individual information technology component; and maintain a dedicated smart contract for the dynamically composed computer infrastructure.

19. The method of claim 11, wherein at least a second portion of the one or more assets are configured to provide transaction data for the second portion of the one or more assets to the one or more application programming interfaces through one or more gateway devices.

20. The method of claim 11, wherein:

the one or more assets include information technology components; and wherein the information management system includes software configured to perform the steps of:

dynamically composing a computer infrastructure through selective assignment of the information technology components;

assigning a dedicated smart contract for each individual information technology component; and maintaining a dedicated smart contract for the dynamically composed computer infrastructure.

\* \* \* \* \*